US010862295B2

(12) United States Patent
Vutetakis

(10) Patent No.: US 10,862,295 B2
(45) Date of Patent: *Dec. 8, 2020

(54) SYSTEM FOR SUPPLYING ELECTRICAL POWER TO START VEHICLE ENGINES

(71) Applicant: CONCORDE BATTERY CORPORATION, West Covina, CA (US)

(72) Inventor: David George Vutetakis, West Covina, CA (US)

(73) Assignee: CONCORDE BATTERY CORPORATION, West Covina, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/843,273

(22) Filed: Apr. 8, 2020

(65) Prior Publication Data

US 2020/0235568 A1    Jul. 23, 2020

Related U.S. Application Data

(63) Continuation-in-part of application No. 16/185,581, filed on Nov. 9, 2018, now Pat. No. 10,626,837.

(51) Int. Cl.
*H02J 7/00* (2006.01)
*H02H 7/18* (2006.01)
(Continued)

(52) U.S. Cl.
CPC ............ *H02H 7/18* (2013.01); *H02H 1/0007* (2013.01); *H02J 7/18* (2013.01)

(58) Field of Classification Search
CPC .................................................... H02H 7/18
(Continued)

(56) References Cited

U.S. PATENT DOCUMENTS 6,242,887 B1 * 6/2001 Burke ................ F02N 11/0866
320/104
6,476,586 B2 * 11/2002 Yunosawa ............... E05B 77/12
307/108

(Continued)

FOREIGN PATENT DOCUMENTS

KR    10-2018-0092508    8/2018
WO    WO 2018/081306    5/2018

OTHER PUBLICATIONS

International Search Report and Written Opinion dated Jan. 31, 2020 for International Application No. PCT/US2019/056224, filed Oct. 15, 2019.

*Primary Examiner* — Yalkew Fantu
(74) *Attorney, Agent, or Firm* — Sheppard, Mullin, Richter & Hampton LLP

(57) ABSTRACT

A protection circuit for protecting an energy storage device includes a first circuit region between a first terminal of the energy storage device and a first connector node, a second circuit region between a second terminal of the energy storage device and a second connector node, a latching circuit to electrically couple the first connector node to the first terminal of the energy storage device when the latching circuit is in a closed configuration, and a contactor circuit electrically coupled to an operational switch of the latching circuit, the contactor circuit comprising a capacitor to store charge and a microcontroller to monitor an electrical property of the energy storage device to determine if a short circuit occurs and, if a short circuit does occur, cause the capacitor to discharge to the operational switch of the latching circuit to cause the latching circuit to transition to the open configuration.

18 Claims, 5 Drawing Sheets

(51) Int. Cl.
*H02H 1/00* (2006.01)
*H02J 7/18* (2006.01)

(58) Field of Classification Search
USPC .......................................... 320/104
See application file for complete search history.

(56) References Cited

U.S. PATENT DOCUMENTS

| | | |
|---|---|---|
| 2004/0196669 A1 | 10/2004 | Thrap |
| 2006/0186859 A1 | 8/2006 | Fujikawa et al. |
| 2009/0314561 A1* | 12/2009 | Handa ................. F02N 11/0866 180/65.25 |
| 2012/0237799 A1* | 9/2012 | Jiang ................. H01M 10/4264 429/7 |
| 2015/0037656 A1 | 2/2015 | Noda et al. |
| 2016/0094056 A1 | 3/2016 | Dulle |

\* cited by examiner

SYSTEM FOR SUPPLYING ELECTRICAL POWER TO START VEHICLE ENGINES

REFERENCE TO RELATED APPLICATIONS

The present application is a continuation-in-part of and claims priority to U.S. patent application Ser. No. 16/185,581, filed Nov. 9, 2018, issued as U.S. Pat. No. 10,626,837, and titled "SYSTEM FOR SUPPLYING ELECTRICAL POWER TO START VEHICLE ENGINES," which is incorporated herein by reference in its entirety.

TECHNICAL FIELD

The disclosed technology relates generally to supplying electrical power for the purpose of starting a vehicle engine. More particularly, various embodiments relate to systems and methods for protecting batteries from under-voltage, over-current, or over-discharge conditions.

BACKGROUND

A powered vehicle, such as an aircraft, car, or boat, often includes one or more batteries for starting the vehicle's engine and/or providing electrical power to the vehicle's systems. For example, vehicle power systems sometimes include lithium-ion, lithium-metal, lead-acid, or nickel-cadmium batteries. Such batteries generally include a negative terminal and a positive terminal immersed in an electrolyte solution. Vehicle batteries may include multiple battery cells connected in series with a negative and positive terminal for providing power to the vehicle and vehicle engine. The battery cells and pair of terminals connect to the electrical system of the vehicle.

Some batteries must incorporate electronic protection to prevent the battery cells from being damaged or becoming unstable from abusive conditions and/or accidental discharge, such as excessive charging voltage or current, excessive discharge current, or excessive depth of discharge. When incorporating these electronic protections into a battery for vehicles, the battery needs to allow for sufficiently high discharge of current to complete the engine start profile. Additionally, the battery needs to be disconnected if subjected to: (i) a current load exceeds the engine start profile (e.g., a low resistance external short circuit); or (ii) to an excessive depth of discharge. Irreversible damage to a battery may be caused by current loads exceeding the engine start profile or excessive depth of discharge.

One approach to solving this challenge for batteries is to incorporate a normally opened contactor in the power circuit between the battery cells and the terminals of the battery. An external switch, which is in an open or closed position, may be mounted on the exterior of the battery or wired in the vehicle. The external switch may energize the coil of the contactor and bring contacts into a closed position. When the external switch is open, the battery is protected from excessive current or excessive depth of discharge. When the external switch is in the closed position, the contactor circuit closes, and the battery is ready to perform the engine start profile. The disadvantage of this approach is the necessity of installing and operating the external switch, and thus adding complexity to the vehicle design and operation.

Another approach to solving this challenge is for batteries is to incorporate a normally closed contactor in the power circuit between the battery cells and the terminals of the battery. With this approach, an external switch is not required to perform an engine start profile. However, power is required to energize the coil and keep the contactor open. If the contactor is opened to protect the battery from excessive current or excessive depth of discharge, the coil requires ongoing power consumption that may completely drain the battery cells of energy and damage the battery.

Excessive current, which may be also be referred to as overcurrent, is a situation where a larger than intended electric current exists through a conductor. This may lead to excessive generation of heat and increased potential for fire hazards. The depth of discharge is the portion of the nominal capacity from a cell or battery removed during each discharge cycle, which is expressed as a percentage. Shallow depth of discharge may be 10% or less level of discharge, where deep depth of discharge may be 80% or more level of discharge.

BRIEF SUMMARY OF EMBODIMENTS

A current protection circuit for use with an energy storage device is disclosed. The current protection circuit may include a first circuit region electrically coupled to a first terminal of the energy storage device, the first circuit region including a first connector node. The current protection circuit may also include a second circuit region electrically coupled to a second terminal of the energy storage device, the second circuit region including a second connector node. The power protection circuit may also include a latching circuit to electrically couple the first connector node to the first terminal of the energy storage device when the latching circuit is in a closed configuration and electrically decouple the first connector node from the first terminal of the energy storage device when the latching circuit is in an open configuration. The latching circuit remains in the closed configuration if no voltage is supplied to an operational switch of the latching circuit. The current protection circuit may also include a contactor circuit electrically coupled to the operational switch of the latching circuit, the contactor circuit including a control component, a microcontroller, and a capacitor electrically coupled to the first circuit region. In some embodiments, the capacitor is configured to store power collected from the first circuit region and the microcontroller is configured to monitor a current or a voltage from the energy storage device and, if the current is above a current threshold value or the voltage is below a voltage threshold value, cause the capacitor to discharge to the operational switch of the latching circuit to cause the latching circuit to transition to the open configuration.

A method for supplying power to start vehicle engines is disclosed, based on the current protection circuit above.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
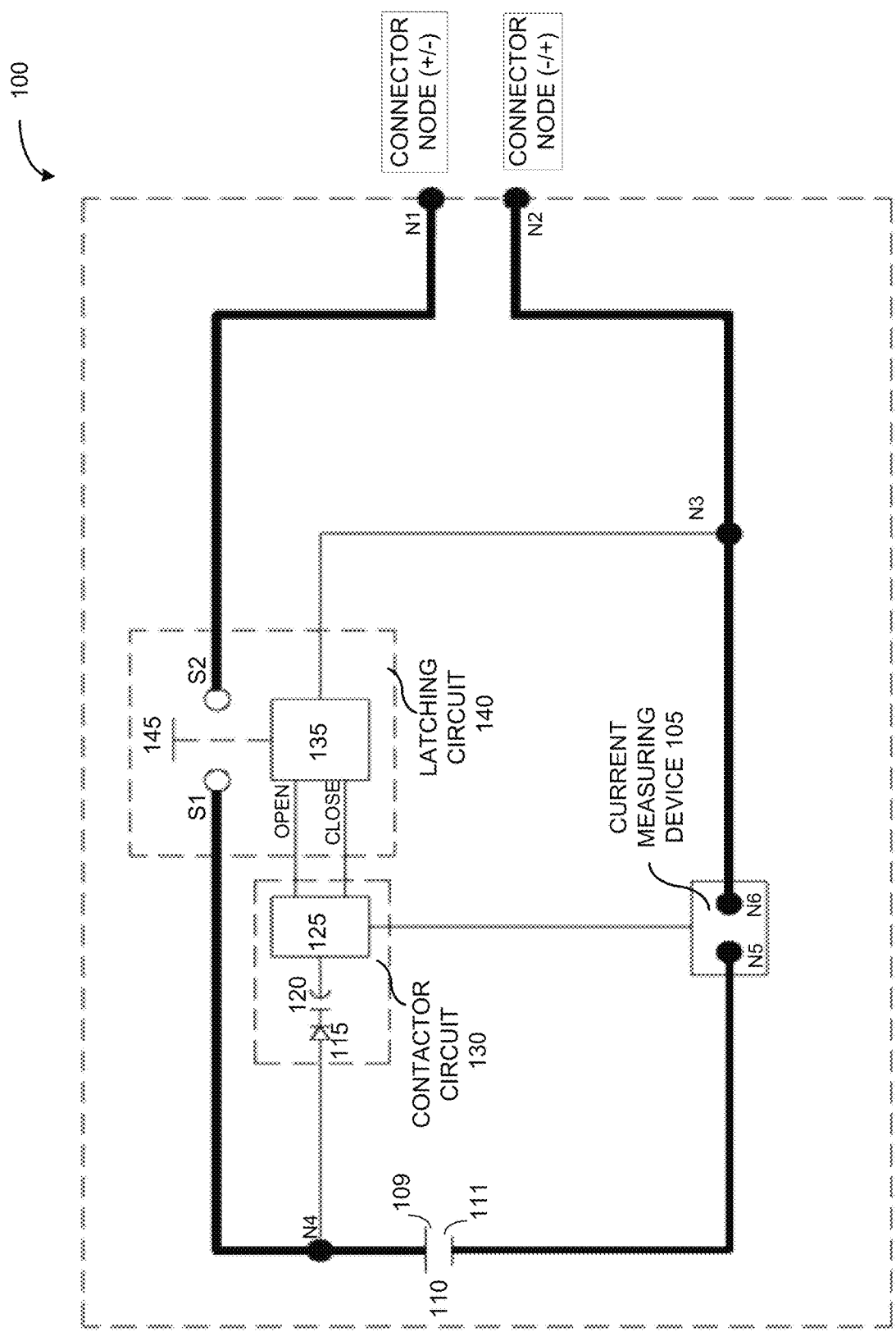
FIG. 1 is a depiction of latching and contactor circuits contained within a device, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Limitations in using either a normally open or normally closed contactor to control the discharge current of the battery may be addressed and overcome by implementing the systems and methods, as disclosed herein. In some embodiments, contactor and latching circuits are used together in combination with a capacitor-driven contactor circuit to open and close the contactor contacts connected to the latching circuits, as contained within a protection circuit for an energy storage device. In some examples, the energy storage device may be a battery, battery cell, or group of battery cells. In some examples, the energy storage device may include capacitors or other energy storage medium. In a default operational state, the protection circuit may enable power to flow from a first connector node to a first terminal of the energy storage device, and from a second terminal of the energy storage device to a second connector node, as to complete a power circuit when the connector nodes are connected to a power drain (e.g., a starter motor for an engine, or electronic components or lights within a vehicle).

Electricity may flow through the protection circuit when the latching circuit is in the closed configuration. However, if the energy storage device is damaged or comes in contact with an alternate electrical path to allow current to bypass the energy storage device (e.g., a short circuit), then voltage may drop to a non-useful and/or near-zero voltage condition, and current may increase to a non-useful condition. These threshold conditions (i.e., voltage is near zero and current is abnormally high for the energy storage device output specifications), may occur suddenly and prevent normal operation of the energy storage device. These parameters (voltage and/or current) can be monitored, and if these threshold conditions are exceeded (i.e., voltage drops below the threshold and/or current increases above the threshold), a microcontroller may provide a signal to the latching circuit to open, thus disconnecting the energy storage device from the rest the circuit to correct the short circuit condition. Because the energy storage device, in a short circuit condition, is not capable of powering the latching circuit to switch it into an open state, embodiments disclosed herein provide a capacitor to store charge from the energy storage device, and discharge to a switch on the latching circuit to drive the latching circuit into the open state. The discharge of the capacitor may be controlled by a microcontroller configured to monitor the protection circuit for under voltage and/or over-current conditions (i.e., a short circuit). The open configuration of the latching circuit protects the energy storage device from excessive current or excessive depth of discharge.

For these instances of excessive current and depth of discharge, the capacitor-driven control circuit commands the contactor contact(s) to be in the open configuration with momentary consumption of power. Concomitantly, ongoing power consumption, which may drain the battery, is suppressed by the systems and methods, as disclosed herein. By switching between the closed configuration and open configuration, the battery assembly disclosed in the embodiments herein may perform an engine start profile without use of an external switch, while having full protection against excessive current or excessive depth of discharge.

FIG. 1 is an example of a protection circuit for an energy storage device that includes a latching circuit and a contactor circuit. The circuitry depicted in FIG. 1 may be directly incorporated into protection circuit 100 for energy storage device 110. Energy storage device 110 may be a battery, a capacitor, a series of battery or capacitor cells, or other energy storage devices. Protection circuit 100 includes a first circuit region between connector node N1 and a first terminal 109 of the energy storage device 110. Protection circuit 100 also includes a second circuit region between connector node N2 and a second terminal 111 of energy storage device 110. In some examples, connector node N1 and first terminal 109 are positive (+) and connector node N2 and second terminal 111 are negative (−). In other examples, the polarities may be reversed such that connector node N1 and first terminal 109 are negative (−) and connector node N2 and second terminal 111 are positive (+). Connector nodes N1 and N2 may be connected to electrical contacts, such as battery terminals, for electric loading or charging of protection circuit 100. Components within protection circuit 100 may be operatively connected to each other via electrical and/or physical contacts. Operatively connected components facilitate the flow of electric currents and voltages. In some examples, the connector nodes N1 and N2 may be physically connected to a power system for a vehicle, e.g., a starter motor, electrical components or instruments, or lights. The vehicle may be an airplane, a boat, an automobile, a train, or other motorized vehicles.

In some embodiments, the first circuit region of protection circuit 100 contains latching circuit 140, which may be placed in between a positive first terminal 109 of energy storage device 110 and connector node N1, which is also positive. The second circuit region contains current measuring device 105, which may be placed in between a negative second terminal 111 of protection circuit 100 where current measuring device 105 and connector node N2, which is also negative. In other embodiments, latching circuit 140 may be placed in the second circuit region containing terminals of energy storage device 110 and connector node N1 (to, for example, the battery assembly) that are negative; and current measuring device 105 may be placed in the first circuit region containing terminals of energy storage device 110 and connector node N2 (to, for example, the battery assembly) that are positive.

Figure 2:
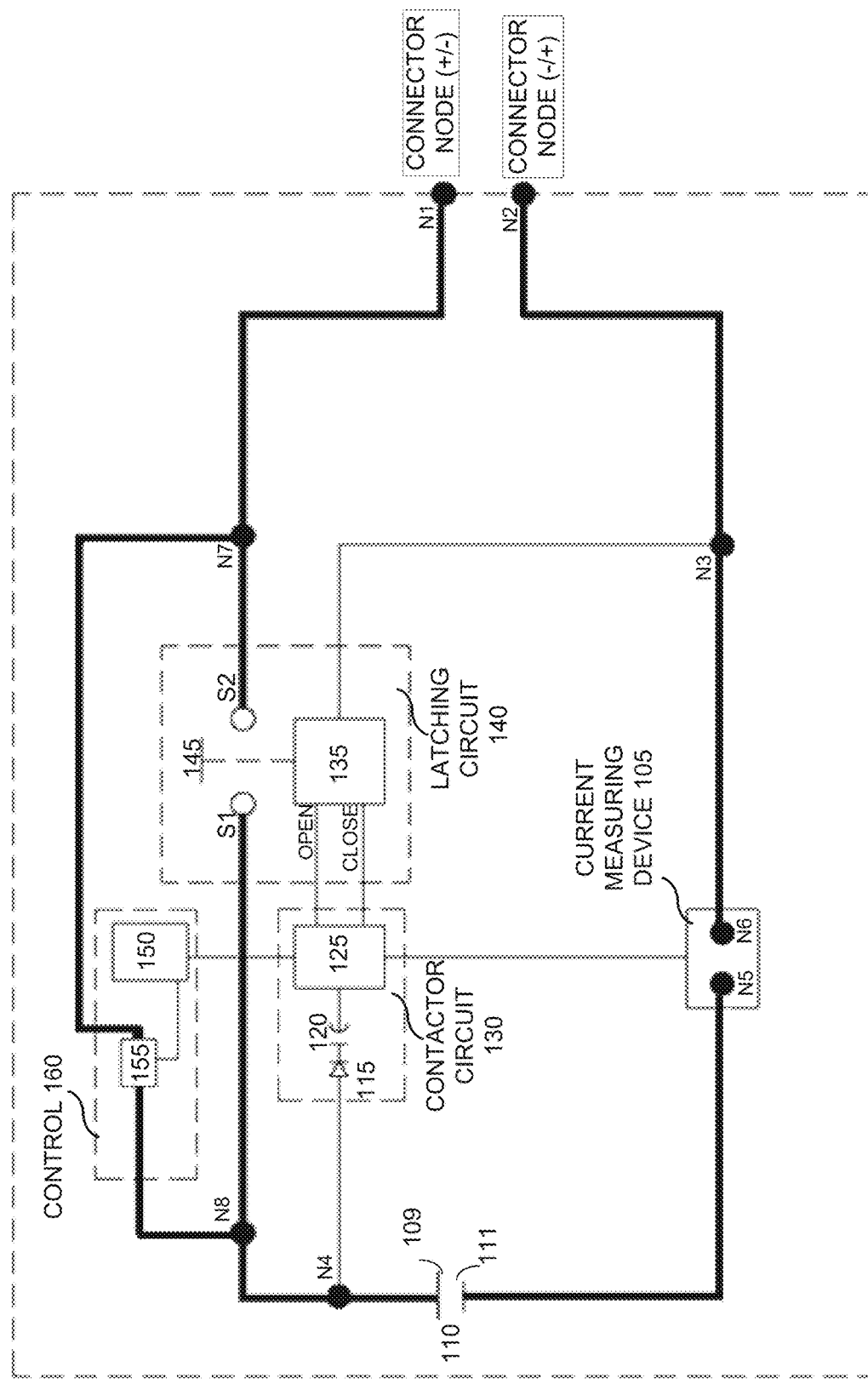
FIG. 2 is a depiction of latching and contactor circuits contained within a device, in combination with transistor circuitry, in accordance with the embodiments disclosed herein.

In some embodiments, current measuring device 105 may include a resistor, an ammeter, or a multimeter, e.g., coupled to the protection circuit using a current shunt. In other embodiments, current measuring device 105 may include a Hall effect device, e.g., a clamp meter or other current meter or gauge as known in the art. Current measuring device 105 may also include components, such as a ground connection and/or a resistor. While a single unit of energy storage device 110 is depicted in FIG. 1 and FIG. 2, multiple units of energy storage device 110 may be incorporated into protection circuits 100 and 200, without departing from the scope of the invention, as claimed. In some examples, first terminal 109 in energy storage device 110 may be a cathode, whereas second terminal 111 may be an anode. In other examples, the reverse polarity may be used where second terminal 111 in energy storage device 110 may be a cathode, whereas first terminal 109 may be an anode.

In some embodiments, energy storage device 110 is derived from lithium-based materials (e.g., lithium ion and lithium polymer batteries). For example, first terminal 109 of protect energy storage device 110 may be lithium cobalt oxide, lithium manganese oxide, lithium iron phosphate, lithium nickel manganese cobalt, or lithium cobalt aluminum oxide; and second terminal 111 may be carbon-based materials (e.g., porous carbon and graphite). Electrolytes, which are immersed around the first terminal 109 and second terminal 111, may be liquid or solid-state materials containing lithium ions. In energy storage device 110, the ions flow from second terminal 111 to first terminal 109 during electrical discharging events, whereas ions flow from first terminal 109 to second terminal 111 during electrical charging events.

In some embodiments, energy storage device 110 is derived from lead-based materials (e.g., lead-acid batteries). For example, first terminal 109 of energy storage device 110 may be lead oxide and second terminal 111 may be elemental lead. Sulfuric acid electrolyte may be dissolved in water or incorporated into silica gels. Lead-acid batteries are also rechargeable, as observed with lithium-ion batteries.

In some embodiments, energy storage device 110 is derived from nickel-based materials (e.g., nickel-cadmium and nickel-metal hydride batteries). For example, first terminal 109 of energy storage device 110 may be nickel (III) oxide-hydroxide. Cadmium or a hydrogen-absorbing alloy may be used as second terminal 111 for a nickel-cadmium or nickel-metal hydride battery cell, respectively. In some embodiments, energy storage device 110 may be a lithium-metal battery.

In some embodiments, contactor circuit 130, which may contain capacitor 120, control component 115, and microcontroller 125, controls the opening and closing states of latching circuit 140, based on the measured current and voltage of protection circuit 100. For example, contactor circuit 130 and latching circuit 140 may be a flip-flop or combination of electronic components (e.g., resistors, transistors, capacitors, and diodes) that has two stable states and stores state information. More specifically, latching circuit 140 contains microcontroller 135, which is physically connected to switch 145, microcontroller 125, and the negative terminal of a battery assembly at node N3. Microcontrollers 125 and 135 may reside as physical devices in contactor circuit 130 and latching circuit 140, respectively. The residing physical devices may be a set or combination of electronic components, microprocessors, and printed circuit boards supporting integrated circuits that implementing Boolean functions. The Boolean functions perform a logical operation on one or more binary inputs for producing a single binary output, such as the closed configuration and open configuration. Current measuring device 105, which measures the current and voltage in protection circuit 100, is electrically or communicatively connected to contactor circuit 130 at microcontroller 125. Microcontroller 125, which is physically connected to microcontroller 135, allows contactor circuit 130 to control the logical output of activating the closed configuration or open configuration of latching circuit 140, based on the measured currents and voltages. As depicted in protection circuit 100, point S1 and point S2 may reside along a circuit region containing connector node N1 and node N4. The position of switch 145 relative to point S1 and point S2 dictates whether protection circuit 100 is in the closed configuration and open configuration.

The standard operating condition, or state, of protection circuit 100 is the closed configuration, where point S1 is electrically connected to point S2 by switch 145. More specifically, switch 145 may be positioned directly in between point S1 and point S2 in the closed configuration, leading to a closed-circuit mechanism that allows sufficient flow of electric current moves from connector node N1 to connector node N2. In the closed-circuit mechanism, the current may move from: connector node N1 to point S2; point S2 to point S1 along switch 145; point S1 to node N4; node N4 to contactor circuit 130; contactor circuit 130 to latching circuit 140 along the "close" line (i.e., the closed configuration contacts) electrically and physically connecting microcontrollers 125 and 135; latching circuit 140 to node N3; and node N3 to node N2.

When protection circuit 100 is in the open configuration, point S1 is not electrically or physically connected to point S2 by switch 145, as depicted in FIG. 1. More specifically, switch 145 may be positioned above or below the level of point S1 and point S2 in the open configuration, leading to an opened-circuit mechanism preventing flow of electric current from connector node N1 to connector node N2. For example, if an external short circuit is applied across the terminals of the battery assembly at connector nodes N1 and N2, the battery voltage may drop below the threshold for activating the open configuration for latching circuit 140. Capacitor 120 may provide sufficient power to latching circuit 140 if the battery voltage is too low, based on a threshold for activating the open configuration for latching circuit 140. Capacitor 120, which is control component 115 protected from external short circuits, may provide the required power along the "open" line (i.e., the open configuration contacts) connecting contactor circuit 130 and latching circuit 140, when the open configuration is activated. Switch 145 is then electrically disconnected from point S1 and point S2 (i.e., opened-circuit), while also electrically disconnecting and protecting energy storage device 110 from external short circuits. For example, control component 115 is a diode physically connected to a polarized capacitor, such as capacitor 120, ensures that electric current: (i) moves towards/into capacitor 120 for storage; and (ii) does not leak into energy storage device 110. In other examples, control component 115 may be a transistor or logic gate sending electric current to capacitor 120 and prevents electric current to energy storage device 110.

FIG. 2 is an example of a protection circuit containing latching and contactor circuits, in combination with transistor circuitry. The circuitry depicted in FIG. 2 may be directly incorporated into a battery assembly that powers protection circuit 200. Protection circuit 200 may include first, second, and third circuit regions containing the positive terminal at connector node N1; the negative terminal at connector node N2 of the battery assembly; and transistor circuitry, respectively. As also indicated with respect to protection circuit 100, connector node N1 and first terminal 109 are positive (+) and connector node N2 and second terminal 111 are negative (−) in some examples of protection circuit 200. In other examples of protection circuit 200, the polarities may be reversed such that connector node N1 and first terminal 109 are negative (−) and connector node N2 and second terminal 111 are positive (+).

Transistor circuitry, also referred to as transistors, are semiconductor devices used to amplify or switch electronic signals and electric power. The transistor circuitry derives from silicon, germanium, gallium arsenide, or silicon germanium that contain at least three terminals. However, other types of semiconducting materials may be used, which are compatible with the other components in protection circuit 200. For example, the transistor circuitry may be bipolar junction transistors (BJTs) containing emitter, base, and collector terminals; or field-effect transistors (FETs) containing source, drain, gate, and body terminals. Junction FETs (JFETs) and metal-oxide semiconductor field-effect transistors (MOSFETs) are two families of FETs. BJTs conduct electricity using both majority and minority charge carriers, whereas FETs conduct electricity using either majority (e.g., n-channel FETs) or minority charge carriers (e.g., p-channel FETs).

In some embodiments, the second circuit region containing the negative terminal in protection circuit 200 is similar or identical to the second circuit region in protection circuit 100. Transistor circuitry (i.e., the third region) is added to protection circuit 100 in parallel to latching circuit 140 to yield protection circuit 200. In contrast to protection circuit 100, the first circuit region of protection circuit 200 may include latching circuit 140 in protection circuit 200 contains point S1, which is physically connected to node N4 via node N8; and point S2, which is physically connected to connector node N1 via node N7. As depicted in protection circuit 200, point S1 and point S2 may reside along a first circuit region containing connector node N1 and node N4.

In some embodiments, control 160 includes transistor 155 and microcontroller 150, where control 160 is physically connected to node N7 and node N8. For example, transistor 155 may be a single 3-terminal transistor device (e.g., BJTs and FETs) or an array of 3-terminal transistor devices. In some embodiments, transistor 155 is a plurality of MOSFETs that can change conductivity via an applied voltage may also be used for amplifying or switching electronic signals. The plurality of MOSFETs may be any combination of n-channel, p-channel FETs, to facilitate the electric current flow towards node N7 or node N8. Microcontroller 150 is a set of microprocessors or microcontrollers physically connected to transistor 155 and microcontroller 125 of contactor circuit 130. For example, a gate terminal of transistor 155 may be connected to microcontroller 150; a source terminal of transistor 155 may be connected to node N7; and a drain terminal of transistor 155 may be connected to node N8. Similarly, if the source terminal of transistor 155 is connected to node N8, then drain terminal of transistor 155 is connected to node N7. Current measuring device 105, which measures voltages and currents of energy storage device 110 and protection circuit 200, is electrically or communicatively connected to microcontroller 125 of contactor circuit 130. In turn, contactor circuit 130 communicates voltage and current measurements to control 160 via the operative connection between microcontrollers 125 and 150. More specifically, transistor 155, which is physically connected with microcontroller 150, can process the voltage and current measurements sent to contactor circuit 130 to control the flow and direction of electric current going through transistor 155.

For example, the side of transistor 155 physically connected to node N7 may facilitate the path for charging energy storage device 110, whereas the side of transistor 155 physically connected to node N8 would then facilitate another path for discharging energy storage device 110. In turn, transistor 155 in control 160 allows the battery to be charged or discharged when latching circuit 140 is in the open configuration or closed configuration. Based on the comparison of voltage and current measurements to thresholds for sustaining emergency loads or temporarily opening latching circuit 140, a first side or a second side of transistor 155 may be activated. Based on the side corresponding to charging and discharging events, electric current may flow into or away from transistor 155, respectively.

Contactor circuit 130 ensures latching circuit 140 is in the closed configuration when electric current for starting the engine is needed. Thus, if transistor 155 comprises FETs, the FETs do not need to be sized to handle engine starting current. However, if the measured electric current exceeds the threshold for starting the engine due to, for example, an external short circuit, then both latching circuit 140 and transistor 155 are in the opened configuration. The open configuration of latching circuit 140 and transistor 155 may allow for the: (i) electrical disconnection and protection of energy storage device 110 from the external short circuit; and (ii) prevention of electric current to flow through transistor 155.

Triggering events that may adversely impact the battery performance, but are not limited to, include: excessive charging voltage or current, excessive discharge current, or excessive depth of discharge. Imbedded electronic circuitry in microcontrollers 125, 135, and 150, which support logical functions, are often referred to as battery management systems ("BMS"). The BMS may be configured to support functions performed in flowchart 300 in FIG. 3 and flowchart 400 in FIG. 4. Though the functionalities of battery management systems may vary in protection circuits 100 and 200, the BMS may be configured to perform the following functions: (i) monitoring and measuring a state of electric charge in a battery to determine the amount of remaining energy stored in the battery; (ii) monitoring a state of health of the battery to determine the life expectancy of the battery, based at least in part on measured electric charges in the battery; (iii) providing battery protection monitoring to ensure safe battery operation; (iv) providing electric charge control for regulating charging electric current and voltage; (v) providing electrical discharge control to ensure that the battery cells are not overly electrically discharged; and (vi) balancing battery cells to ensure that all the battery cells are electrically charged to substantially the same capacity.

By preventing improper electric charging and discharging of batteries (e.g., lithium-ion cells), the BMS can prevent sub-optimal battery power output, shortened battery cell lifespan, battery cell damage, and potentially hazardous over-heating. By balancing energy storage device 110 in protection circuits 100 and 200, the BMS can ensure that there are no individual undercharged units of energy storage device 110 that electrically discharge prematurely; cause the entire battery supported system (e.g., protection circuits 100 and 200) to become inoperable; or overcharge units of energy storage device 110 that leads to cell venting and excessive cell temperatures.

Figure 3:
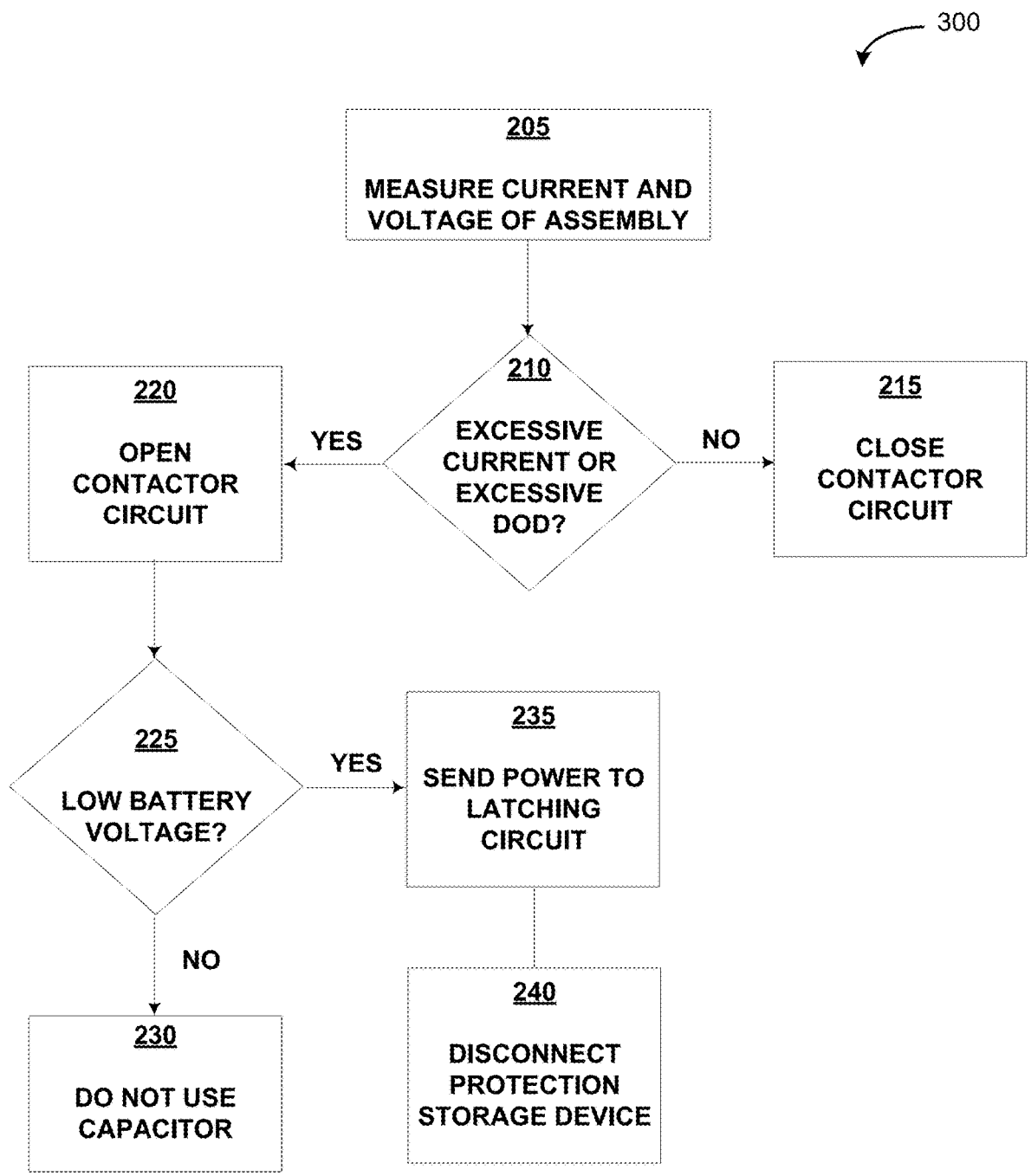
FIG. 3 is a flowchart for opening and closing the contactor circuit in a device, in accordance with embodiments disclosed herein.

FIG. 3 is an example of a flowchart for opening and closing the contactor circuit in a battery assembly-powered device. As stated above, the BMS in FIG. 1, such as microcontrollers 125 and 135, may be operatively configured with other electrical components via physical, communicative, or electrical connections. The BMS either directly performs or instructs or invokes other components to perform the functions in flowchart 300. Flowchart 300 corresponds to functions performed within protection circuit 100. The combination of BMS within contactor circuit 130 and latching circuit 140 for controlling the position of switch 145 may implement feedback loops to counteract triggering events that may adversely impact the performance of protection circuit 100. The triggering events may include: (i) excessive charging or discharging events; and (ii) low voltage events.

For example, the BMS containing microcontroller 125 is communicatively connected to current measuring device 105. The BMS invokes current measuring device 105 to measure the voltage and current of the battery assembly-powered protection circuit 100 at step 205. Excessive electric current charge or discharge are triggering events that may adversely impact the performance of protection circuit 100. Energy storage device 110 in protection circuit 100 may become damaged by excessive electric current charging via short circuits or electric current discharge, as measured by depth of discharge (DOD). The BMS compares current thresholds deemed acceptable for operating energy storage device 110 to the capacity of energy storage device 110 (i.e., the amount of electric charge that can be delivered at a rated voltage). Based on this comparison, the BMS determines if excessive current or excessive DOD triggering events are occurring in energy storage device 110 or other parts of protection circuit 100, at step 210.

If the BMS determines excessive current or excessive DOD triggering events are not occurring at step 210, then the BMS closes contactor circuit 130 (i.e., the "No" branch) at step 215. More specifically, the logical output of the closed configuration for contactor circuit 130 is activated in microcontroller 125, which is sent to latching circuit 140. As stated above, the closed configuration is the standard operating condition of protection circuit 100. More specifically, a relay switch, such as switch 145, is connected to point S1 and point S2 to yield a closed-circuit on which a closed-circuit mechanism is possible.

If the BMS determines excessive current or excessive DOD triggering events are occurring at step 210, then the BMS opens contactor circuit 130 (i.e., the "Yes" branch) at step 220. More specifically, the logical output of the open configuration for contactor circuit 130 is activated in microcontroller 125, which is sent to latching circuit 140. As stated above, the open configuration is not the standard operating condition of protection circuit 100. More specifically, a relay switch, such as switch 145, is not connected to point S1 and point S2 to yield an opened-circuit on which a closed-circuit mechanism is not possible. The position of the switch 145 relative to point S1 and point S2 must be modified such that switch 145 does not connect point S1 and point S2 to each other. There is momentary power consumption along the connection from microcontroller 125 in contactor circuit 130 to microcontroller 135 in latching circuit 140 when the logical output of the open configuration is activated. While it is necessary to consume power for modifying the position of switch 145 from a closed configuration to an open configuration (i.e., physically move the position of switch 145 such that point S1 and point S2 are not connected to each other) that yields an opened-circuit, ongoing power consumption that would drain energy storage device 110 is avoided by the resulting opened-circuit system. In contrast, the ongoing power consumption that would drain energy storage device 110 is not avoidable in a closed-circuit system.

As stated above, electric charge may flow from control component 115 (e.g., a diode as depicted in FIG. 1 and FIG. 2) to capacitor 120 to microcontroller 125 to microcontroller 135 whether the open configuration or closed configuration is activated. The BMS compares preconfigured voltage thresholds deemed acceptable for providing sufficient power in operating latching circuit 140 to the capacity of energy storage device 110 (i.e., the amount of electric charge protection circuit 100 can deliver at a rated voltage). Based on this comparison, the BMS determines if the voltage in energy storage device 110 is too low for powering latching circuit and other components in protection circuit 100 at step 225.

If the BMS determines the voltage in energy storage device 110 is not too low for powering latching circuit 140 at step 225, then the BMS sends power to latching circuit 140 (i.e., the "No" branch) at step 230. More specifically, the BMS invokes capacitor 120 in contactor circuit 130 for powering latching circuit 140. There may be instances where the logical output of the open configuration in contactor circuit 130, which is sent to latching circuit 140, is activated in microcontroller 125. However, there is still enough voltage in energy storage device 110 for operating and powering protection circuit 100.

If the BMS determines the voltage in energy storage device 110 is too low for operating latching circuit 140 at step 235, then the BMS invokes capacitor 120 to send power to latching circuit 140 (i.e., the "Yes" branch) at step 235. Capacitor 120, which is included in contactor circuit 130, provides sufficient power to latching circuit 140 if the voltage of energy storage device 110 is too low. For example, if an external short circuit is applied across the terminals of the battery assembly, the voltage of energy storage device 110 drops too low to activate or maintain the open configuration of latching circuit 140. Capacitor 120, which is diode-protected from the short circuit and contains stored power, provides the stored power to open the latching contactor (i.e., activating the open configuration contact between microcontrollers 125 and 135). Additionally, the BMS disconnects energy storage device 110 from protection circuit 100 at step 240. Thus, energy storage device 110 is fully protected from the external short circuit.

Figure 4:
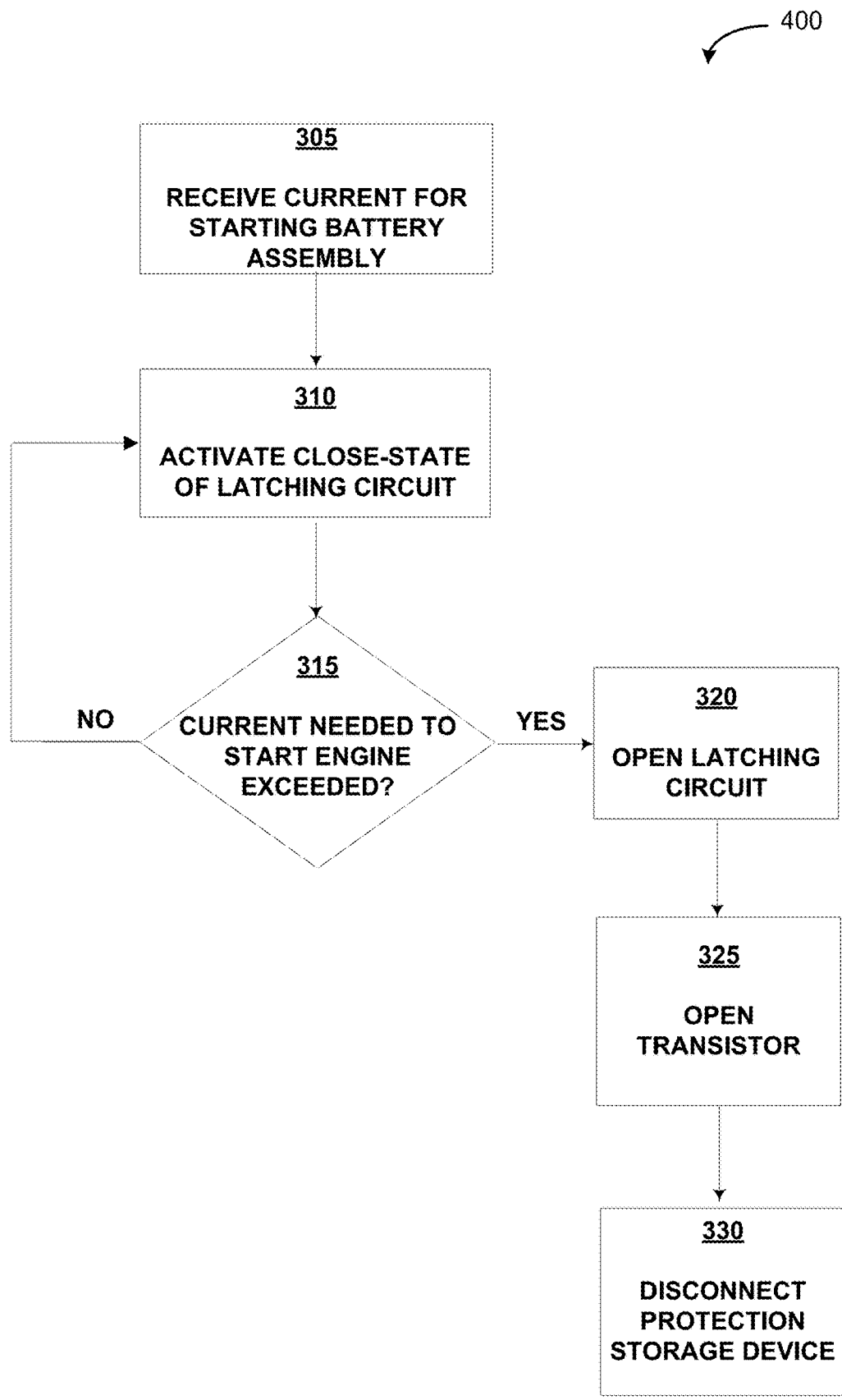
FIG. 4 is a flowchart for opening and closing the contactor circuit in a device, in combination with transistor circuitry, in accordance with embodiments disclosed herein.

FIG. 4 is an example of a flowchart for opening and closing the contactor circuit in a battery assembly-powered device, in combination with transistor circuitry. As stated above, the BMS in FIG. 2, such as microcontrollers 125, 135, and 150, may be operatively configured with other electrical components via physical, electrical, or communicative connections. The BMS either directly performs or instructs or invokes other components to perform the functions in flowchart 400. Flowchart 400 corresponds to functions performed within protection circuit 200. The combination of BMS within contactor circuit 130, latching circuit 140, and control 160 for controlling the position of switch 145 may implement feedback loops to counteract triggering events that may adversely impact the performance of protection circuit 200. The triggering events may include: (i) excessive charging or discharging events; and (ii) counteract low voltage events.

For example, the BMS containing microcontroller 125 is communicatively connected to current measuring device 105. The BMS receives electric current for starting protection circuit 200 at step 305. The source of electric current may derive from the positive terminal at connector node N1 and the negative terminal at connector node N2 in protection circuit 200 (or the negative terminal at connector node N1 and the positive terminal at connector node N2 in protection circuit 200). More specifically, the engine, which is operatively connected to protection circuit 200, is started upon the BMS receiving sufficient electric current.

The BMS activates the logical output of the closed configuration of latching circuit 140 at step 310. As stated above, the standard operating condition for protection circuit 200 is the closed configuration. More specifically, contactor circuit 130 is activated in microcontroller 125 along the closed configuration line (i.e., the closed configuration contacts) connected to microcontroller 135 in latching circuit 140.

The BMS determines if the electric current needed to start the engine is exceeded at step 315. If the BMS determines the electric current needed to start the engine is not exceeded at step 315, then the BMS maintains the activation of the closed configuration (i.e., the "No" branch). Thus, excessive current events, such as a short circuit, are not occurring. Additionally, contactor circuit 130 ensures latching circuit 140 is closed when sufficient electric current is needed for starting the engine.

However, if the BMS determines the electric current needed to start the engine is exceeded at step 315, then the BMS invokes contactor circuit 130 to open latching circuit 140 (i.e., the "Yes" branch) at step 320. Thus, excessive currents, such as a short circuit, may be occurring in energy storage device 110 or other parts of protection circuit 100.

When the BMS determines the measured current exceeds that needed for starting the engine due to, for example, an external short circuit at step 315, the BMS instructs transistor 155 to be opened at step 325 and energy storage device 110 in battery assembly-powered protection circuit 200 to be disconnected at step 330. In one example, control 160 is parallel to the positive terminals in the first circuit region and allows for other electric loads to be powered through transistor 155 even if latching circuit 140 is in the open configuration. For example, contactor circuit 130 is in the open configuration and energy storage device 110 is cold. When electrically charging energy storage device 110 that is too cold, energy storage device 110 and other components of battery assembly-powered protection circuit 200 may be damaged. To prevent electric charging into energy storage device 110 when latching circuit 140 is in the open configuration, transistor 155 activates the connection to node N7 or node N8. The activated connection at node N7 or node N8 depends whether scenario 1 or scenario 2 is operable. Additionally, scenarios 1 and 2 complement each other, meaning that if the connection at node N7 is activated in scenario 1, then the connection at node N8 is activated in scenario 2. In this example, while preventing electric charging of energy storage device 110 (i.e., scenario 1), transistor 155 activates the connection to node N7. Thus, electric current flow occurs along node N7. If energy storage device 110 needs to be electrically discharged to sustain an emergency current load (i.e., scenario 2), transistor 155 activates the other connection to node N8. Thus, electric current flow occurs along node N8.

Figure 5:
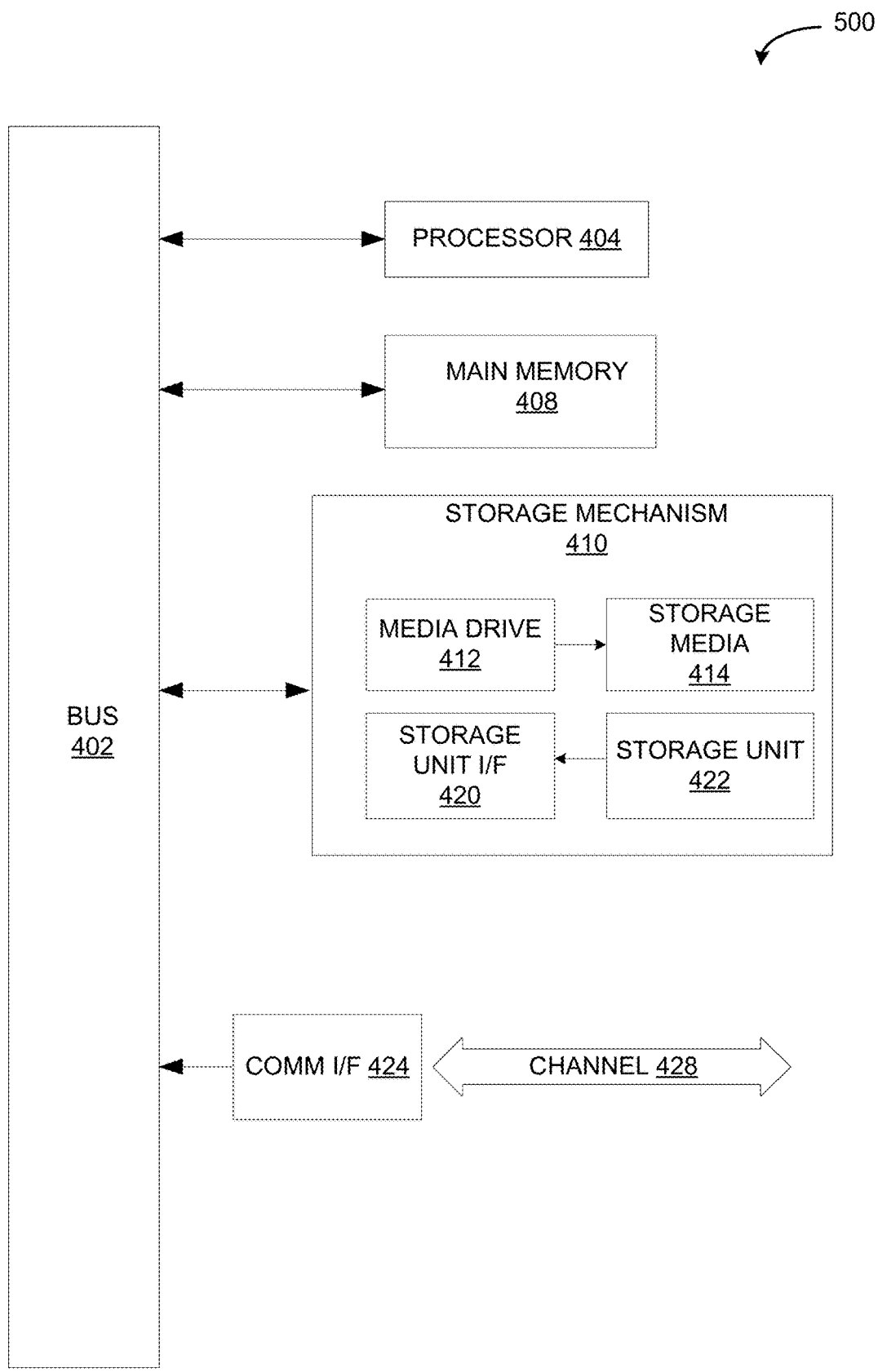
FIG. 5 is a computing component that may be used in implementing various features of the systems and methods, in accordance with embodiments disclosed herein.

As described above, microcontrollers 125, 135, and 150 may be microcontrollers, components, logical circuits, or engines of the technology implemented in whole or in part for operating the devices above. In one embodiment, elements of the device can be implemented to operate with a computing or logical circuit capable of carrying out the functionality described with respect thereto. One such example logical circuit is shown in FIG. 5. Various embodiments are described in terms of this example logical circuit 500. After reading this description, it will become apparent to a person skilled in the relevant art how to implement the technology using other logical circuits or architectures.

Referring now to FIG. 5, logical circuit 500 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 500 might also represent computing capabilities embedded within or otherwise available to a given device, such as protection circuits 100 and 200. For example, a logical circuit might be found in other electronic devices such as, for example, digital cameras, navigation systems, cellular telephones, portable computing devices, modems, routers, WAPs, terminals and other electronic devices that might include some form of processing capability.

Logical circuit 500 might include, for example, one or more processors, controllers, control engines, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of logical circuit 500 or to communicate externally.

Logical circuit 500 might also include one or more memory engines, simply referred to herein as main memory 408. For example, preferably random-access memory (RAM) or other dynamic memory, might be used for storing information and instructions to be executed by processor 404. Main memory 408 might also be used for storing temporary variables or other intermediate information during execution of instructions to be executed by processor 404. Logical circuit 500 might likewise include a read only memory ("ROM") or other static storage device coupled to bus 402 for storing static information and instructions for processor 404.

Logical circuit 500 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to, or accessed by media drive 412. As these examples illustrate, the storage media 414 can include a computer usable storage medium having stored therein computer software or data.

In alternative embodiments, information storage mechanism 440 might include other similar instrumentalities for allowing computer programs or other instructions or data to be loaded into logical circuit 500. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory engine) and memory slot, a PCMCIA slot and card, and other fixed or removable storage units 422 and interfaces 420 that allow software and data to be transferred from the storage unit 422 to logical circuit 500.

Logical circuit 500 might also include a communications interface 424. Communications interface 424 might be used to allow software and data to be transferred between logical circuit 500 and external devices. Examples of communications interface 424 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 500 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A protection circuit for protecting an energy storage device, wherein the current protection circuit comprises:
 a first circuit region electrically coupled to a first terminal of the energy storage device, the first circuit region comprising a first connector node;
 a second circuit region electrically coupled to a second terminal of the energy storage device, the second circuit region comprising a second connector node;
 a latching circuit to electrically couple the first connector node to the first terminal of the energy storage device when the latching circuit is in a closed configuration and electrically decouple the first connector node from the first terminal of the energy storage device when the latching circuit is in an open configuration, the latching circuit remaining in the closed configuration if no voltage is supplied to an operational switch of the latching circuit; and
 a contactor circuit electrically coupled to the operational switch of the latching circuit, the contactor circuit comprising a microcontroller and a capacitor electrically coupled to the first circuit region, wherein the capacitor is configured to store power collected from the first circuit region and the microcontroller is configured to monitor a current or a voltage from the energy storage device and, if the current is above a current threshold value or the voltage is below a voltage threshold value, cause the capacitor to discharge to the operational switch of the latching circuit to cause the latching circuit to transition to the open configuration;
 wherein the battery is a lithium-metal battery or a nickel-metal hydride battery.

2. The protection circuit of claim 1, wherein the first terminal is a positive terminal and the first connector node is a positive node, the second terminal is a negative terminal, and the second connector node is a negative node.

3. The protection circuit of claim 1, wherein the first terminal is negative terminal, the first connector node is a negative node, the second terminal is a positive terminal, and the second connector node is a positive node.

4. The protection circuit of claim 1, wherein the energy storage device comprises a battery.

5. The protection circuit of claim 1, further comprising:
 a third circuit region electrically connecting the first connector node to the first terminal and electrically bypassing the latching circuit, wherein the third circuit region comprises a transistor, the transistor being communicatively coupled to the microcontroller.

6. The current protection circuit of claim 5, wherein the transistor is selected from a group consisting of a bipolar junction transistor (BJT), a field-effect transistor (FET), a transistor array, and combinations thereof.

7. The protection circuit of claim 1, wherein the contactor circuit further comprises a current control component located between the capacitor and the first terminal, the current control component configured to prevent current from flowing from the capacitor to the first terminal of the energy storage device.

8. The protection circuit of claim 1, wherein the current control component is selected from a group consisting of a diode, a transistor, and a logic gate.

9. The protection circuit of claim 1, wherein the second circuit region comprises a current shunt located between the second terminal of the energy storage device and the second connector node, wherein the microcontroller of the contactor circuit is communicatively coupled to the current shunt to monitor the current or the voltage across the current shunt.

10. The protection circuit of claim 1, wherein the second circuit region comprises a Hall effect device located between the second terminal of the energy storage device and the second connector node, wherein the microcontroller of the contactor circuit is communicatively coupled to the Hall effect device to monitor the current.

11. A method for protecting an energy storage device using a protection circuit comprising a first circuit region between a first connector node and a first terminal of the energy storage device, a second circuit region between a second connector node and a second terminal of the energy storage device, a latching circuit located in an electrical path of the first circuit region and configured to electrically connect the first terminal to the first connector node when the latching circuit is in a closed configuration, and a contactor circuit comprising a microcontroller and a capacitor electrically coupled to the latching circuit, the method comprising:
 storing an electrical charge on the capacitor, the electrical charge being generated by the energy storage device;
 monitoring, with the microcontroller, an electrical property of the current protection circuit;
 determining, with the microcontroller, if a short circuit has occurred based on the electrical property; and
 causing the capacitor to discharge to the latching circuit if a short circuit occurred, the discharge of the capacitor to the latching circuit causing the latching circuit to transition to an open configuration to electrically disconnect the first connector node from the first terminal of the energy storage device;
 wherein the battery is a lithium-metal battery or a nickel-metal hydride battery.

12. The method of claim 11, wherein the energy storage device is a battery.

13. The method of claim 11, wherein the electrical property comprises a voltage or a current.

14. The method of claim 13, wherein determining if the short circuit has occurred comprises comparing the electrical property to a threshold current value or a threshold voltage value.

15. The method of claim 13, further comprising preventing the capacitor to discharge to the first terminal of the energy storage device when there is a short circuit using a current control component located between the capacitor and the first terminal of the energy storage device.

16. The method of claim 15, wherein the current control device comprises a diode, a transistor, or a logic gate.

17. The method of claim 11, wherein monitoring of the electrical property comprises measuring a voltage or a current across a current shunt located between the second terminal of the energy storage device and the second connector node.

18. The method of claim 11, wherein monitoring of the electrical property comprises measuring a current across a Hall effect device located between the second terminal of the energy storage device and the second connector node.

* * * * *